United States Patent [19]

Jeffers et al.

[11] 4,106,028

[45] Aug. 8, 1978

[54] METHOD AND APPARATUS FOR FORMING MAGNETIC IMAGES BY PIEZOELECTRIC COUPLING BETWEEN AN OPTICAL IMAGE AND A MAGNETOSTRICTIVE IMAGING COMPONENT

[75] Inventors: Frederick John Jeffers, Escondido; Richard John McClure, San Diego; James Underwood Lemke, Del Mar, all of Calif.

[73] Assignee: Eastman Technology, Inc., Rochester, N.Y.

[21] Appl. No.: 840,878

[22] Filed: Oct. 11, 1977

[51] Int. Cl.[2] ........................ G03G 19/00; G11B 5/00

[52] U.S. Cl. ..................................... 346/74.1; 360/55; 365/157

[58] Field of Search ................. 346/74.1; 360/113, 55; 365/157, 7

[56] References Cited

U.S. PATENT DOCUMENTS

| | | | |
|---|---|---|---|
| 2,683,856 | 7/1954 | Kornei | 365/157 |
| 2,942,928 | 6/1960 | Levin | 360/113 |
| 3,735,369 | 5/1973 | Iida | 365/157 |
| 3,909,809 | 9/1975 | Kinsner | 365/7 |
| 3,922,687 | 11/1975 | Trimble | 345/74.1 |

OTHER PUBLICATIONS

"Components that Learn and How to Use Them", Crafts, Article in Electronics Mag., 3/22/63, p. 40.

*Primary Examiner*—Jay P. Lucas

*Attorney, Agent, or Firm*—Robert F. Cody

[57] ABSTRACT

Method and apparatus are provided for forming a magnetic image on a recording element replicating incident image illumination. The recording element is a composite structure comprising a photoconductive, piezoelectric component and a magnetostrictive component. By rigidly associating these components, mechanical stress generated by the illumination of the photoconductive, piezoelectric component is transmitted to the magnetostrictive component, in which the mechanical stress is converted to imagewise coercivity variations. If the recording element is simultaneously subjected to a magnetic field, a remanent magnetic field that replicates the image is produced in the magnetostrictive component.

9 Claims, 4 Drawing Figures

METHOD AND APPARATUS FOR FORMING MAGNETIC IMAGES BY PIEZOELECTRIC COUPLING BETWEEN AN OPTICAL IMAGE AND A MAGNETOSTRICTIVE IMAGING COMPONENT

BACKGROUND OF THE INVENTION

1. Field of the Invention

The invention pertains in general to method and apparatus for forming a magnetic image. More particularly, the invention provides for the generation of a magnetic image through the influence of optically induced dimensional variations upon the coercivity of a magnetostrictive material.

2. Description Relative to the Prior Art

The method and apparatus for forming a magnetic image in accordance with this invention is based on two phenomena: magnetostriction and piezoelectricity. Piezoelectricity is the property of certain dielectric crystals wherein a difference of electric potential is developed across them as a result of applied mechanical stress. Conversely, the application of a voltage between certain faces of the dielectric crystal produces a mechanical distortion of the material. This reciprocal relationship is referred to as the piezoelectric effect. The phenomenon of generation of a voltage under mechanical stress is referred to as the direct piezoelectric effect, and the mechanical strain produced in the crystal under electric stress is called the inverse piezoelectric effect.

Magnetostriction is descriptive of the property of certain materials which undergo a change in dimension when exposed to a magnetic field. These changes are extremely small in most substances, but they may be comparatively large in those which show ferromagnetic or similar behavior. Conversely, the existence of strain in a typical ferromagnetic material causes a change in its internal anisotropy energy that is, in turn, reflected primarily in a change in the coercivity of the material. Such strain can produce either an increase or decrease in coercivity depending on the characteristics of the material being used and the direction of the strain. In general, the magnetization of the material is affected indirectly insofar as either the coercivity is changed or demagnetizing fields influence the material.

For certain purposes, it is appropriate to rigidly fix a layer of piezoelectric material to a layer of magnetostrictive material such that any elastic strain produced in the magnetostrictive material is transmitted to the piezoelectric material which in turn generates an electric signal. Involving therefore a double energy conversion, such a device is useful as a sensor for detecting one form of energy and providing a reading in another form. For example, in U.S. Pat. No. 3,909,809, a magnetostrictive-piezoelectric device senses magnetic domains propagated in a sheet of magnetic bubble-domain supporting material. The magnetic energy associated with the bubble-domain is converted to elastic energy by means of the magnetostrictive material. The elastic energy is then in turn converted to electrical energy by means of the piezoelectric material. Finally an electrical output which represents the presence of a bubble domain is taken from across the piezoelectric material.

In addition to layering the magnetostrictive and piezoelectric materials, the interconversion of magnetic and electrical fields can also be achieved by the utilization of a composite material grown in situ, consisting of a piezomagnetic and piezoelectric component (see, for example, "Piezoelectric/Magnetic Material", *Elect. Opt. Systems Design*, Sept. 1974, page 5). For example, a molten eutectic mixture of barium titanate and cobalt ferrite may be allowed to solidify unidirectionally to obtain such a composite structure.

SUMMARY OF THE INVENTION

The method and apparatus in accordance with the present invention utilizes energy interconversion provided by a type of photosensitive piezoelectric material in which incident illumination is converted into mechanical energy. When used with an image-corresponding illumination the distribution of the mechanical strain replicates the image light. By rigidly associating the piezoelectric material with a magnetostrictive material, as by chemical deposition, the mechanical strain — now in the form of the image — is transmitted to the magnetostrictive material in the form of an imagewise strain. As is the characteristic of a magnetostrictive material, this strain causes a corresponding variation in the coercivity of the material; such strain may produce either an increase or decrease in coercivity depending on the characteristics of the material being used and the direction of the strain. As the strain was image-caused, so now does the distribution of coercivity replicate the image. If the composite layer is exposed to a moderate magnetic field while being illuminated, it will be generally magnetized in a pattern corresponding to the image-caused strain; consequently, the residual magnetization will be a replication of the image. The magnetic image may be developed and transferred in the usual manner to obtain a toned copy.

In a presently preferred embodiment, a photoconductive piezoelectric material, such as Cadmium Sulfide (CdS), normally supports electric charge in surface states, resulting in an electric field in the surface layer which produces a surface strain due to the piezoelectric effect. Accordingly, illumination of the surface changes the surface charge density which causes a corresponding change in the electric field in the surface layer. Since the magnetostrictive material will be uniformly affected by the usual and uniform surface strain in the piezoelectric material, the addition of surface illumination will change this strain and accordingly modify the coercivity of the magnetostrictive material.

BRIEF DESCRIPTION OF THE DRAWINGS

The invention will be further described with reference to the figures, in which.

DESCRIPTION OF THE PREFERRED EMBODIMENT

Because magnetic copying apparatus is well known, the present description will be directed in particular to elements forming part of, or cooperating more directly with, the present invention. Copier elements not specifically shown or described herein are understood to be selectable from those known in the art.

Figure 1:
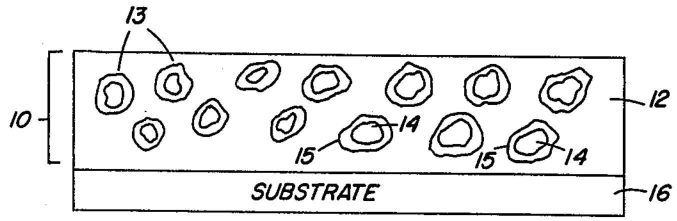
FIG. 1 is a representation of the photoconductive, piezoelectric, magnetostrictive magnetic imaging structure of the invention.

Referring now to FIG. 1, a composite recording layer 10 includes a transparent binder material 12 in which imaging particles 13 are dispersed throughout. Each particle 13 includes an inner core of magnetostrictive material 14 surrounded by a layer of photosensitive piezoelectric material 15. For purposes of illustration the size of the particles 13 is greatly exaggerated; in practice the core material 14 may be 1$\mu$ in diameter. The composite recording layer is coated on a layer of substrate material 16. The photosensitive piezoelectric is preferably selected from the groups of II-VI semiconductors, such as cadmium sulfide (CdS). Studies of thin crystals of such materials have found that incident illumination induces a sizeable elastic deformation. For example, light induced surface stress changes of 250 dyne/cm have been observed in CdS and much higher values of up to $10^5$ dyne/cm may be possible in corona charged zinc oxide (see "Photomechanical Vibration of Thin Crystals of Polar Semiconductors", by Jacek Lagowski and Harry C. Gatos, *Surface Science*, Vol. 45, 1974, pp. 353–370).

Such research has led to the conclusion that light-induced mechanical vibration observed in thin crystals of CdS can be explained with a model based on the coupling of electrical and mechanical properties in an essentially insulating surface depletion layer. When a clean crystal is exposed to air, oxygen molecules are strongly chemisorbed on the surface and form electron acceptor states in the forbidden energy gap of the material. This lowers the free carrier concentration at the surface which bends the energy bands up in that region. The presence of this bound surface charge results in an electric field across the surface depletion layer and, the material being a piezoelectric substance, this field produces a surface strain proportional to the surface barrier height. Assuming the surface depletion layer was established in darkness, when image light impinges on the surface, conduction electrons are produced, some of which fill the oxygen electron acceptor states, consequently bending the energy bands down and decreasing surface strain in that region. In effect, the height of the surface barrier, and hence the surface strain, is modulated in accordance with the image.

When a solid is placed in a magnetic field it undergoes changes in its dimensions, the effect being known as magnetostriction. An inverse effect is the change in coercivity produced by a mechanical stress on a magnetized body. The latter effect is determinative of the choice of material for the magnetostrictive core material 14. In general the magnetostrictive effect, and its inverse, is comparatively large in those materials which show ferromagnetic or similar behavior. Nickel, Alfenol (87 percent Fe, 13 percent Al), bismuth, cobalt, cobalt substituted nickel-copper-ferrous ferrites (e.g. Ferroxcube 7Al) or tellurium ferrite are appropriate for the magnetostrictive core 14. Depending on the characteristics of the magnetostrictive material being used and the direction of the strain imposed therein, increasing the strain can cause either an increase or decrease in the coercivity of the material.

FIG. 1 is useful for illustrating the piezoelectric layer 15 in rigid attachment with the underlying magnetostrictive core 14 of each imaging particle 13. Rigidity is important since the dimensional changes induced by the image light in the piezoelectric layer 15 must be transmitted, at least in part, to the magnetostrictive core 14. In practice, the photoconductive layer 15 is epitaxially deposited from aqueous solution onto a dispersion of fine magnetostrictive particles. Alternatively, both materials can be grown in situ as a composite material in accordance with the previously cited article from *Elect. Opt. Systems Design.* Certain types of deposition are more suitable since both the piezoelectric constant and the magnetostriction constant are tensor quantities; for example, after epitaxial deposition the tensors may be symmetrically matched on either side of the interface between the two materials if they have similar crystal symmetry. The magnetostrictive core material 14 is preferably of single domain size and consisting of a magnetic material having hexagonal symmetry and a crystalline anisotropy constant large enough to yield a coercivity of more than about 200 oersteds. In addition the core material 14 should possess sufficient magnetization ($B_s \simeq 3000$ gauss) to afford efficient tonability in a typical dispersion. The particles are then dispersed in a flexible transparent binder 12 and coated in the form of a film on the non-magnetic substrate 16.

Figure 2:
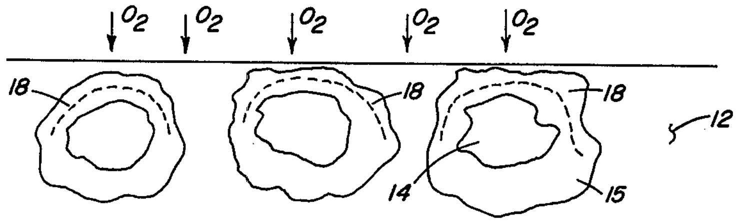
FIG. 2 is a schematic representation of one probable model useful in explaining the photoconductive property of the imaging particles.

As illustrated in a greatly magnified cross-section in FIG. 2, a uniform surface depletion layer 18, in the piezoelectric layer 15 results from the chemisorption of oxygen molecules. For purposes of explaining the invention, it is assumed that this procedure is completed in darkness. However, a limited uniform illumination will not destroy the subsequent usefulness of the composite recording layer. The surface depletion layer 18 supports an electric field that is uniform over the surface; the layer 15 being piezoelectric, this electric field causes a dimensional strain in the magnetostrictive core 14. Due to the properties of the core material, its coercivity is therefore uniformly affected by the chemisorption of oxygen atoms.

Figure 3:
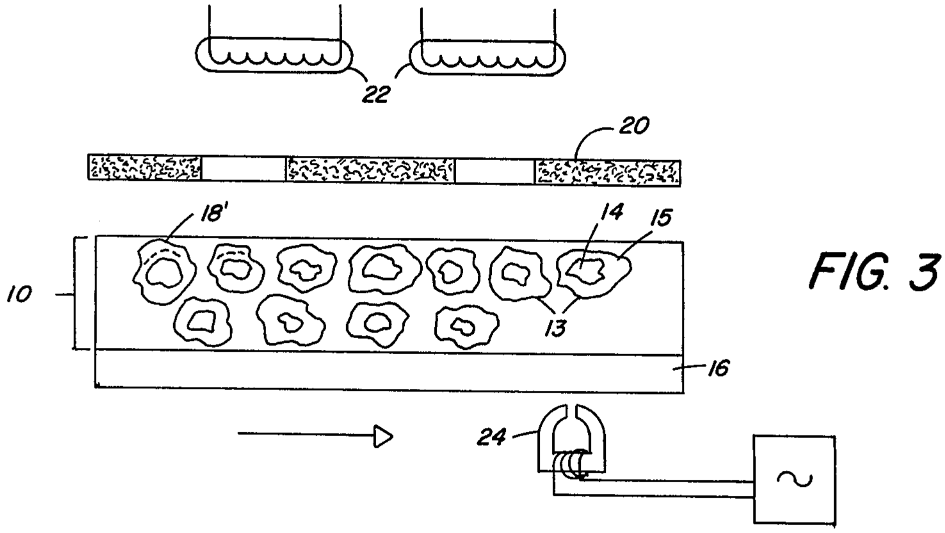
FIGS. 3 and 4 are schematic diagrams useful in teaching the formation of a magnetic image in accordance with the invention.

When, as in FIG. 3, a stencil 20 is interposed between an illuminant 22 and the recording layer 10, image light replicating the stencil image strikes the image particles 13 and enters the surface depletion region 18 of the piezoelectric layer 15. The effect is such that under strong illumination the surface barrier essentially vanishes. The accompanying sudden decrease in the electric field in the depletion region 18 correspondingly causes a selective relaxation in the dimensional strain in the piezoelectric layer 15. Since the materials 15 and 14 are rigidly joined by chemical deposition, the image related mechanical relaxation is communicated to the magnetostrictive core 14, where the image modulation of dimensional strain causes a corresponding modulation in the coercive characteristic of the material. Where the image light has struck the photoconductive, piezoelectric material, the coercivity of the magnetostrictive material attached thereto has been accordingly reduced. If the step illustrated in FIG. 3 is completed while the magnetostrictive core 14 is exposed to a moderate magnetic field from a magnetic head 24 or some other source, the core material 14 will be magnetized in a pattern replicating the image.

Figure 4:
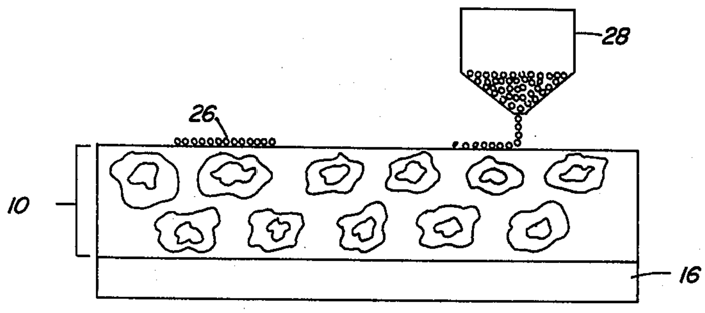

Referring now to FIG. 4, magnetic toner particles 26 from a hopper 28 are allowed to flow across the recording layer 10 in a conventional toning process. The magnetic moment in the magnetostrictive cores is sufficient to induce a field above the surface of the recording layer 10. Hence, the magnetic image in the magnetostrictive core 14 will attract the toner particles 26 and cause them to remain on the magnetized areas. The toned image may be then transferred to a copy matrix in a conventional transfer process (not shown).

The steps illustrated in FIGS. 3 and 4 will produce a negative image of the stencil 20. As before mentioned, the magnetostrictive core material 14 may be so selected that diminished strain thereupon will increase its coercivity. Consequently, the magnetization operation illustrated in FIG. 3 and the toning operation in FIG. 4 would produce a positive image.

The invention has been described in detail with particular reference to a presently preferred embodiment thereof, but it will be understood that variations and modifications can be effected within the spirit and scope of the invention.

What is claimed is:

1. A method for forming a magnetic image on a composite recording layer that includes a photoconductive, piezoelectric component adapted for converting incident illumination into mechanical strain and a magnetostrictive component rigidly coupled therewith and adapted for varying its coercivity in accordance with communicated mechanical strain comprising the steps of:

forming a surface depletion layer in the surface region of the photoconductive, piezoelectric component;

selectively reducing the depth of said depletion layer in an imagewise pattern; and magnetizing the magnetostrictive component in the recording layer while said depletion layer is selectively reduced, said magnetization providing a selective magnetic pattern corresponding to said selectively reduced depletion layer pattern, thereby to form a magnetic image.

2. The method as described in claim 1 in which the step of forming a depletion layer comprises exposing the recording layer to a gaseous environment including oxygen such that oxygen molecules are chemisorbed into the surface region of said photoconductive piezoelectric component, thereby lowering the free carrier concentration in said surface region.

3. The method as described in claim 1 in which the photoconductive, piezoelectric component is cadmium sulfide.

4. The method as described in claim 1 in which the step of selectively reducing the height of said uniform depletion layer comprises exposing the surface region of the photoconductive, piezoelectric component to an imagewise illuminant.

5. A method for making a toned magnetic copy of an image comprising the steps of:

forming a recording element comprising a photoconductive, piezoelectric component mechanically cooperative with a magnetostrictive component having a coercive characteristic dependent upon imposed dimensional strain;

forming a surface electric field in said photoconductive, piezoelectric component for causing a uniform dimensional strain that is transmitted to said magnetostrictive component by means of said mechanical cooperation between said two components;

providing an imagewise modulation of said surface electric field for causing imagewise variations in said transmitted dimensional strain for in turn varying said coercive characteristic of said magnetostrictive component in an imagewise manner;

subjecting said magnetostrictive component to a magnetic field while said electric field is modulated, thereby providing imagewise remanent magnetization of said magnetostrictive component; and developing a toned magnetic copy by toning said recording element with a magnetic toner.

6. The method as described in claim 5 in which the step of forming a recording element comprises chemically depositing said photoconductive, piezoelectric component on said magnetostrictive component.

7. The method as described in claim 5 in which the step of providing an imagewise modulation comprises exposing said photoconductive, piezoelectric component to an imagewise illumination.

8. Apparatus for magnetically recording an image of a desired object on a recording element comprised of a photoconductive, piezoelectric component rigidly cooperative with a magnetostrictive component, the photoconductive, piezoelectric component being disposed to convert incident illumination into mechanical strain via an electric field and the magnetostrictive component being disposed to convert mechanical strain into variations in its coercivity, the apparatus comprising:

means for so generating a uniform surface electric field in the recording element that a uniform mechanical strain thereby generated in the photoconductive, piezoelectric component is communicated to the magnetostrictive component by said rigid cooperation therewith and therein results in a uniform coercivity;

means for so exposing the recording element to an imagewise illuminant that said surface electric field is varied in a pattern replicating the object; said varied surface electric field causing a similar varied mechanical strain that is communicated to said magnetostrictive component by said rigid cooperation therewith to produce an imagewise variation in said coercivity; and means for permanently magnetizing said magnetostrictive component while said coercivity thereof is varied and thereby forming a magnetic image replicating the object.

9. The apparatus as described in claim 8 in which the means for generating a uniform surface electric field comprises means for exposing the recording element to a gaseous environment including oxygen such that oxygen is chemisorbed into the photoconductive, piezoelectric component thereby forming a surface depletion region having a uniform surface electric field.

* * * * *